United States Patent [19]

Foley

[11] 4,277,407
[45] Jul. 7, 1981

[54] NOVEL TRIARYLMETHANE COMPOUNDS

[75] Inventor: James W. Foley, Andover, Mass.

[73] Assignee: Polaroid Corporation, Cambridge, Mass.

[21] Appl. No.: 106,900

[22] Filed: Dec. 26, 1979

[51] Int. Cl.$^3$ .............................................. C09B 11/10
[52] U.S. Cl. .................................. 260/390; 260/389; 260/395; 260/338; 260/386; 544/3; 544/162; 544/170; 544/171; 544/229; 544/237; 544/239; 544/192; 260/388
[58] Field of Search ............... 260/389, 395, 390, 386, 260/338; 544/3, 162, 170, 171, 229, 237, 239, 192

[56] References Cited

U.S. PATENT DOCUMENTS

| | | | |
|---|---|---|---|
| 3,406,069 | 10/1968 | Overman | 96/74 |
| 3,624,131 | 11/1971 | Becker | 260/395 X |
| 4,080,371 | 3/1978 | Tresper et al. | 260/395 |

*Primary Examiner*—Paul F. Shaver
*Attorney, Agent, or Firm*—Sybil A. Campbell

[57] ABSTRACT

The present invention is concerned with novel triarylmethane dyes possessing in their triaryl structure a 4'-oxo-1'-naphthylidene (or a 4'-oxo-1'-phenylidene) moiety and a phenyl moiety substituted in the ortho-position to the central carbon atom with the group

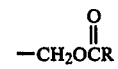

wherein R is hydrogen; alkyl, unsubstituted or substituted with halo, alkoxy, carboxy-substituted alkoxy, phenoxy or phenyl; or phenyl, unsubstituted or substituted with halo, alkoxy, nitro, dimethylamino or alkyl, which compounds find utility in photographic products and processes.

15 Claims, No Drawings

NOVEL TRIARYLMETHANE COMPOUNDS

BACKGROUND OF THE INVENTION

1. Field of the Invention

This invention relates to novel chemical compounds, and more particularly, it relates to novel triarylmethane compounds which are useful, e.g., as light-screening dyes in photographic products and processes.

2. Description of the Prior Art

It is well known that photographic film, and especially multicolor films, may and generally do vary from lot to lot, notwithstanding efforts to "repeat" previous films. Manufacturers of multicolor photographic films have developed a number of procedures to minimize the effects upon the final multicolor image of unavoidable variations in the manufacturing operations. These variations are reflected primarily in shifts in color balance as reflected in mismatching of the D log E curves of the individual red, green and blue exposures. Equipment used to coat multicolor films is highly precise but variations between intended coverage of silver halide and/or the dye image-forming materials do occur. Repeat batches of silver halide emulsions may, and usually do, vary in their photographic response. Individual layers may be dried to slightly different degrees. Films are stored for a period of time after coating to allow the films to "age", so that changes in sensitometry following coating have an opportunity to reach a plateau prior to sale. If the film is designed to be developed by a photofinisher or in a darkroom, processing of the exposed multicolor film is controlled within very narrow limits, typically within plus or minus a half degree of a prescribed temperature, in order to minimize sensitometric variations from film to film. Where the multicolor film is of the negative type, an opportunity to adjust the sensitometry occurs in printing the desired final positive image, during which operation the printing exposure may be appropriately color filtered.

The basic sources of sensitometric variations noted above exist also in multicolor diffusion transfer films, with the added complication that once the film is shipped, the sensitometric properties are essentially fixed. The opportunity for adjustment provided in darkroom processing, practically speaking, is unavailable for users of self-developing films. While professional and advanced amateur photographers may be skillful enough to utilize color correction filters to at least partially "rebalance" the color balance, ordinary users of the film would only be confused by such additional operations.

It is well known to use light-screening dyes in photographic elements. Such a dye may be incorporated as a filter dye in a light-sensitive emulsion layer(s) or in a layer coated over one or more light-sensitive emulsion layers or between two differently color-sensitized emulsion layers to modify the light record in the emulsion layer or to control the spectral composition of light falling on the underlying light-sensitive layer, or it may be incorporated as an antihalation dye in a non-light-sensitive layer positioned on either side of a support carrying the light-sensitive layer(s).

The dyes employed for these purposes, in addition to having the requisite spectral absorption characteristics for their intended use, should not have any adverse effect on the properties of the light-sensitive emulsion layer(s), and also, should be capable of being decolorized or removed during photographic processing so as not to leave stain in the processed photographic element. In photographic processes where the dye is removed by being dissolved in a processing solution, it is usually preferred that the dye also decolorize in order to avoid contamination of the processing solution and to prevent staining from residual dye in the processed light-sensitive element.

Though various classes of dyes have been proposed for use in antihalation and color correction filter layers, the dyes heretofore employed have not been altogether satisfactory. Some of the dyes tend to reduce sensitivity, fog or exert other adverse effect on the light-sensitive material. However, the major drawback of previously employed dyes is their tendency to cause stain due to incomplete decolorization or reversal of some of the decolorized form to the original colored form. For example, some classes of dyes rely on the presence of a reagent, such as, a sulfite for "bleaching," i.e., decolorization and unless the dyes are removed from the light-sensitive material during or after processing, their color may reappear in time.

Among the classes of light-screening dyes used previously are the triarylmethanes. For example, U.S. Pat. Nos. 1,879,537; 1,994,876; 2,350,090 and 3,005,771 disclose the use of fuchsone-type dyes in antihalation layers, and U.S. Pat. Nos. 3,406,069 and 3,615,548 are concerned with the metal chelates of fuchsone dyes as antihalation dyes. These and other types of triarylmethane dyes suffer from one or more of the drawbacks discussed above, and in particular, prior dyes of this type have been difficult to keep decolorized at the pH's normally encountered during processing subsequent to bleaching and in the final product.

The present invention is concerned with a class of triarylmethane dyes which find utility as photographic light-screening dyes that are free from the deficiencies associated with the dyes previously used for this purpose. The subject triarylmethane dyes, which will be defined with greater particularity hereinafter, are efficient absorbers of radiation within a predetermined range in the visible range of 400 to 700 nm, may be incorporated in gelatin or other processing composition-permeable colloidal binding agents and are decolorized at an alkaline pH to yield a colorless product. Because of their ability to decolorize completely and irreversibly in base without requiring an additional reagent, such as, a sulfite for the "bleaching" reaction and because the new colorless product produced upon irreversible cleavage remains colorless in aqueous solution over a pH range of 1 to 14, the cleavage product may be retained in the photographic light-sensitive element without the possibility of color reappearing in time. Besides being non-staining, the compounds usually are substantially inert with respect to the light-sensitive material and thus, may be positioned in a layer adjacent to a silver halide emulsion layer or directly incorporated into an emulsion layer without having any adverse effect on the properties of the emulsion.

SUMMARY OF THE INVENTION

It is therefore the primary object of the present invention to provide novel triarylmethane compounds.

It is another object of the present invention to provide triarylmethane compounds useful as light-screening dyes in photographic products and processes.

Other objects of this invention will in part be obvious and will in part appear hereinafter.

This invention accordingly comprises the products and compositions possessing the features, properties and the relation of elements which are exemplified in the following detailed disclosure, and the scope of the application of which will be indicated in the claims.

According to the present invention, novel triarylmethane compounds are provided which possess in their triaryl structure a 4'-oxo-1'-naphthylidene (or a 4'-oxo-1'-phenylidene) moiety and a phenyl moiety substituted in the ortho-position to the central carbon atom with the group

wherein R is hydrogen; alkyl, unsubstituted or substituted with halo, alkoxy, carboxy-substituted alkoxy, phenoxy or phenyl; or phenyl, unsubstituted or substituted usually in the meta or para position with halo, alkoxy, nitro, dimethylamino or alkyl.

For a fuller understanding of the nature and objects of the present invention, reference should be had to the following detailed description.

DETAILED DESCRIPTION OF THE INVENTION

The novel compounds provided by the present invention may be represented by the formula

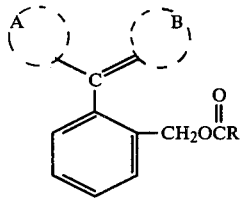

(I)

wherein A is a phenyl moiety or a naphthyl moiety; B is a 4'-oxo-1'-phenylidene moiety or a 4'-oxo-1'-naphthylidene moiety and R is selected from hydrogen; alkyl, unsubstituted or substituted with halo, alkoxy, carboxy-substituted alkoxy, phenoxy or phenyl; or phenyl, unsubstituted or substituted usually in the m- or p-position with halo, alkoxy, nitro, dimethylamino or alkyl. Usually, the halo substituent is chloro or bromo, the alkoxy substituent is lower alkoxy having 1 to 4 carbon atoms, and the alkyl groups are lower alkyl having 1 to 4 carbon atoms.

As noted above, the subject compounds are initially colored, i.e., capable of absorbing visible radiation, and at an alkaline pH, are converted to a colorless product by undergoing an irreversible cleavage reaction with base. The colorless product formed is a new compound which is different from and non-reversible to the colored compound by a change in pH. In particular, it is the

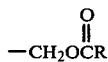

group substituted on the phenyl moiety in a position ortho to the central carbon atom that undergoes the irreversible cleavage reaction in alkaline solution that is complete within a predetermined time at a predetermined alkaline pH to give the new colorless compound, namely, the cyclic ether (phthalan), as illustrated by the following wherein the A moiety is 4'-hydroxyphenyl and the B moiety is 4'-oxo-phenylidene.

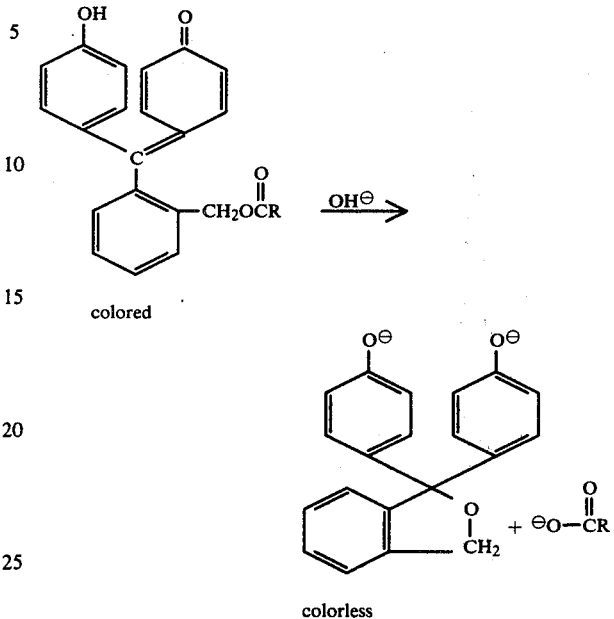

It will be appreciated that the acid salt formed upon cleavage of the ester group also is colorless. Because the said cleavage reaction proceeds at a faster rate at higher pH's, the subject compounds are particularly suitable for use in photographic processes where the pH is maintained above about 10 at least for the time necessary for decolorization to the corresponding phthalan.

It will be understood that the A moiety and/or the B moiety of the compounds represented in formula I above may contain one or more substituents in addition to those specified, which substituents should not interfere with the intended use of the compounds.

Typical substituents include branched or straight chain alkyl, such as, methyl, ethyl, isopropyl, n-butyl, t-butyl, hexyl, octyl, dodecyl, hexadecyl, octadecyl and eicosanyl; aryl, such as phenyl and naphthyl; alkaryl and aralkyl, preferably, alkyl-substituted phenyl and phenyl-substituted alkyl, such as p-ethylphenyl, p-octylphenyl, p-dodecylphenyl, benzyl, phenethyl, phenylhexyl and phenyldodecyl; alkoxy, such as, methoxy, ethoxy, butoxy, octadecyloxy, 1-ethoxy-2-(β-ethoxyethoxy); aryloxy, such as, phenoxy, benzyloxy and naphthoxy; alkoxyalkyl, such as, methoxymethyl, ethoxymethyl, and dodecyloxyethyl; halo, such as, fluoro, bromo and chloro; trihalomethyl, such as, trifluoromethyl and trichloromethyl; sulfonamido (—NH—SO$_2$R° wherein R° is alkyl, aryl, alkaryl or aralkyl); sulfamoyl (—SO$_2$—NH—R° wherein R° has the same meaning given above); acyl

wherein R° has the meaning given above); sulfonyl (—SO$_2$—R° wherein R° has the same meaning given above); sulfo; cyano; carboxy, hydroxy; amino including mono- and disubstituted amino (—NR'R" wherein R' and R" each are hydrogen, alkyl, aryl, alkaryl or aralkyl and R' and R" taken together represent the atoms necessary to complete a heterocyclic ring, such as piperidino, pyrrolidino, N-lower alkylpiperazino, morpholino, thiomorpholino and tetrahydro-2H,4H-1,3,6-dioxazocino.

Typical of the triarylmethane compounds of the present invention are those represented by the following formula

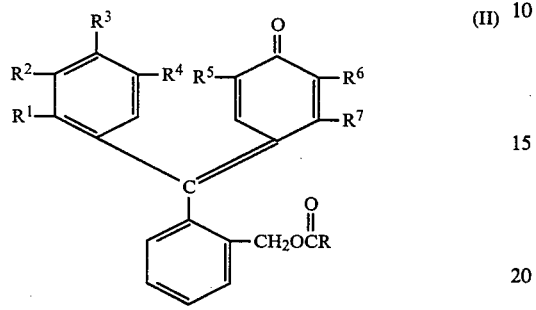
(II)

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, —N,N-(dialkyl)amino, —N,N—(w-$R^8$alkyl)$_2$amino wherein $R^8$ is halo or hydroxy; piperidino, pyrrolidino, N-methylpiperazino, morpholino, thiomorpholino or tetrahydro-2H,4H—1,3,6-dioxazocino; $R^5$ is hydrogen, phenyl, alkyl, alkoxy, chloro or fluoro; $R^6$ is hydrogen, alkyl, alkoxy, chloro or fluoro; $R^7$ is hydrogen, alkyl, alkoxy or hydroxy and $R^6$ and $R^7$ taken together represent the carbon atoms necessary to complete a fused benzene ring; and R is hydrogen; alkyl, unsubstituted or substituted with halo, alkoxy, carboxy-substituted alkoxy, phenoxy or phenyl; or phenyl, unsubstituted or substituted in the m- or p-position with halo, alkoxy, nitro, dimethylamino or alkyl.

Usually, the alkyl and alkoxy substituents comprising $R^1$, $R^2$, $R^3$, $R^4$, $R^5$, $R^6$ and $R^7$ are lower alkyl having 1 to 4 carbon atoms, such as, methyl, ethyl, n-propyl, isopropyl and n-butyl and lower alkoxy having 1 to 4 carbon atoms, such as, methoxy, ethoxy, propoxy and butoxy. Also, the alkyl groups of the —N,N-(dialkyl)amino and —N,N-(w-$R^8$alkyl)$_2$amino subtituents usually are lower alkyl having 1 to 4 carbon atoms and $R^8$, when halo, is preferably chloro. Usually, $R^3$ is hydroxy or —N,N—(dialkyl)amino.

Specific examples of compounds within the scope of the present invention are as follows:

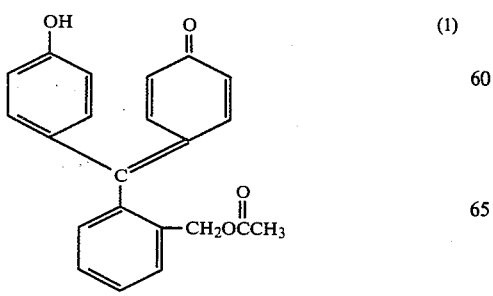
(1)

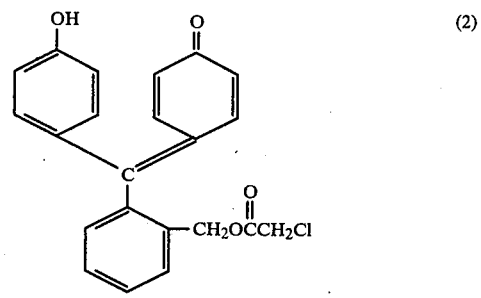
(2)

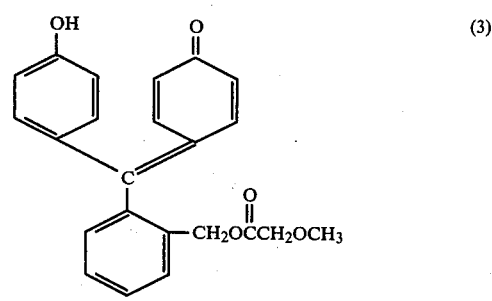
(3)

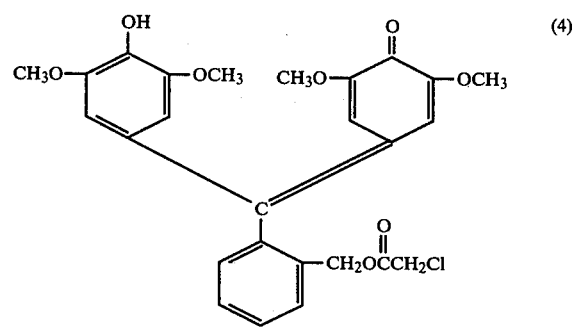
(4)

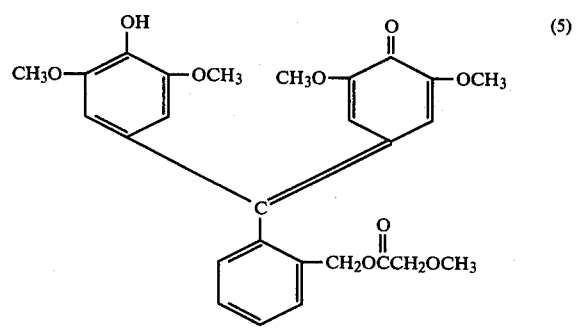
(5)

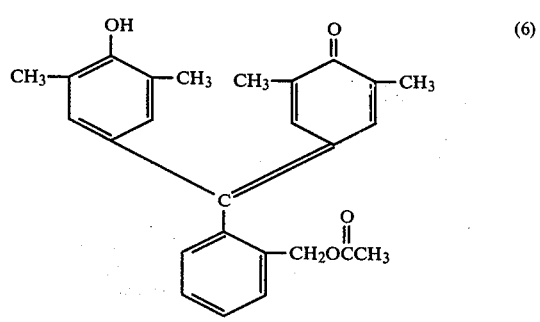
(6)

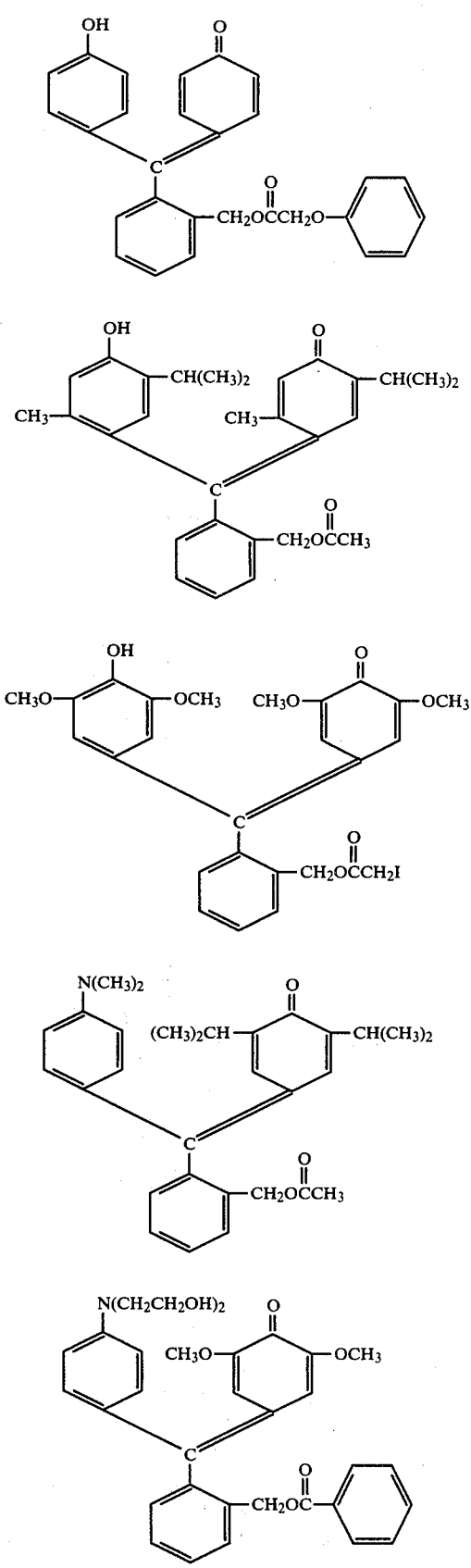
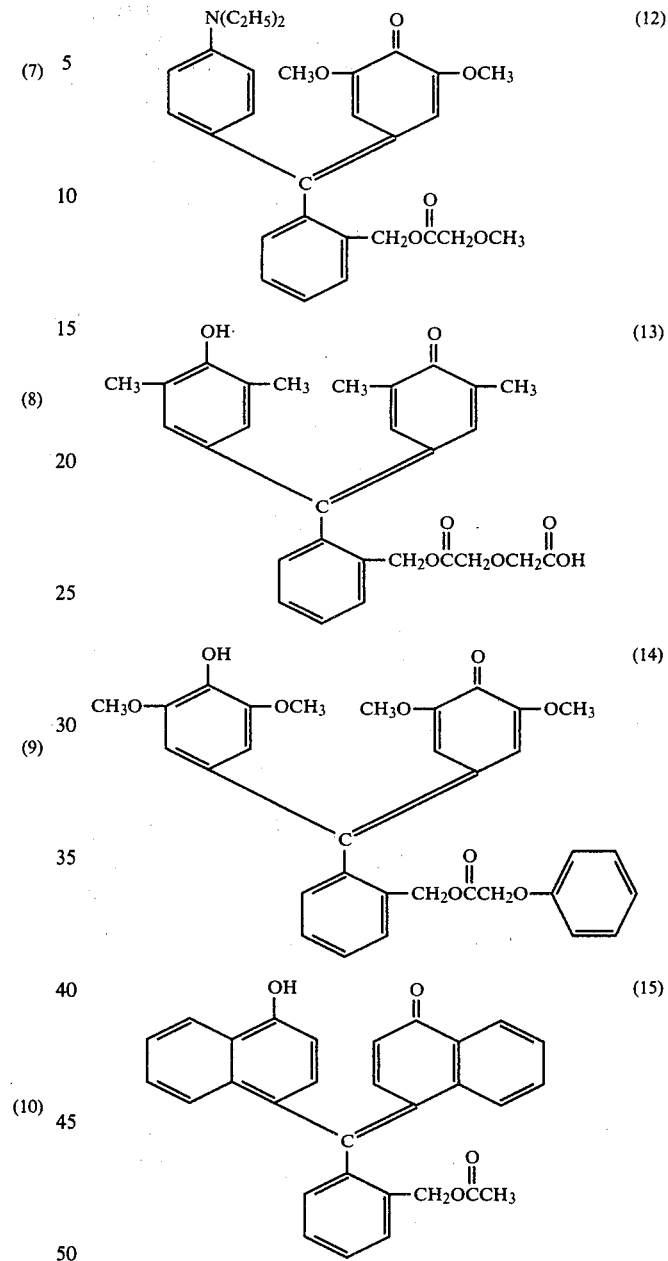

The compounds of the present invention may be prepared by converting the selected 3,3-disubstituted phthalide (phthalein) to the corresponding phthalin, forming the methyl ester of the phthalin, reducing it to the corresponding phthalol and then forming the acyl derivative of the phthalol which is oxidized to yield the triarylmethane dye product. This synthesis is illustrated below employing phenolphthalein as the starting phthalide.

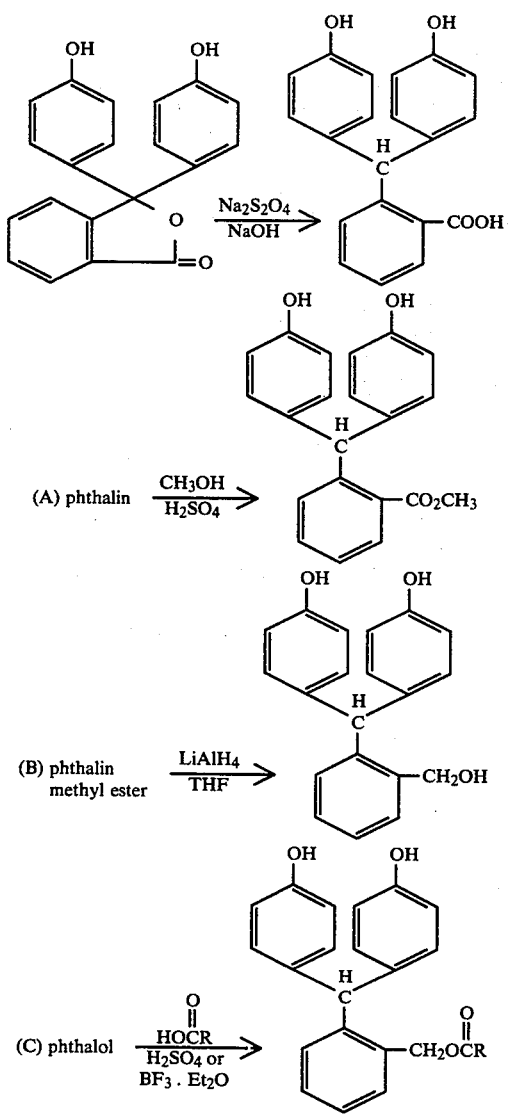

(A) phthalin (B) phthalin methyl ester (C) phthalol

R has the same meaning given in formula I

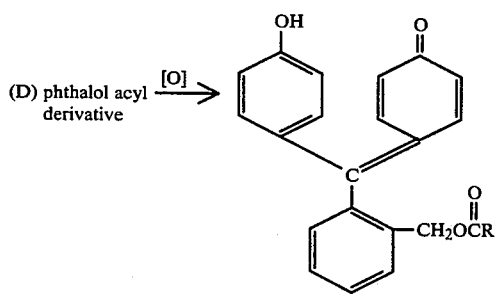

(D) phthalol acyl derivative

Another method of preparing the subject compounds comprises reducing the selected 3,3-disubstituted phthalide starting material with lithium aluminum hydride in anhydrous tetrahydrofuran. Depending upon the substituents present in the phthalide, the reduction product is the corresponding phthalol, phthalin, phthalan or mixtures thereof. Where the phthalan is formed, it is reacted with the appropriate acid, HOOCR, in the presence of sulfuric acid or boron trifluoride catalyst to yield the triarylmethane dye product. This synthesis is illustrated below using phenolphthalein as the phthalide starting material.

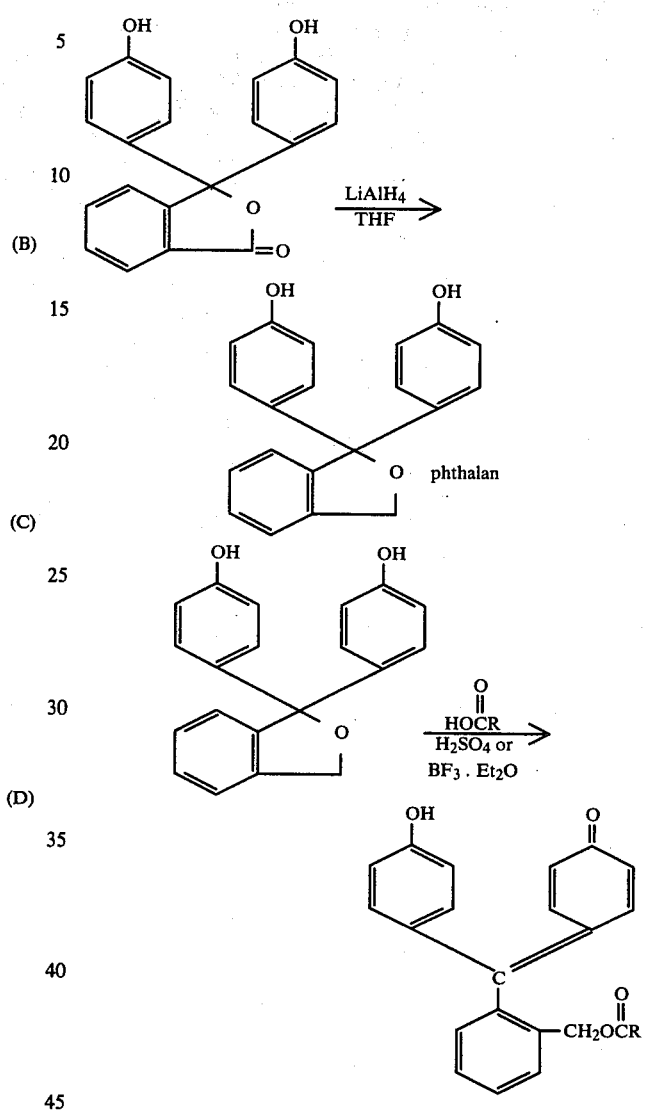

R has the same meaning given in formula I.

Where the phthalin is formed as the reduction product, it can be converted to the methyl ester etc. as illustrated in the previous reaction sequence for (A) through (D). Where the phthalol is formed as the reduction product, it can be reacted with the appropriate acid, HOOCR, to give the corresponding acyl derivative followed by oxidation to the triarylmethane dye product as shown in the previous reaction scheme for (C) and (D). Alternatively, the phthalol can be oxidized to the corresponding phthalan using, for example, o-chloranil or dicyanodichloroquinone, and the phthalan reacted with the appropriate acid as discussed above.

The 3,3-disubstituted phthalides used as the starting materials in the above syntheses may be prepared using various methods known in the art. In one of the more conventional procedures, phenols, such as, thymol, o-cresol and phenol itself are reacted with phthalic anhydride at elevated temperatures in the presence of a suitable catalyst such as zinc chloride or sulfuric acid to yield the corresponding symmetrical 3,3-disubstituted phthalide, i.e., wherein the 3,3 substituents are the same.

Another method of sythesizing 3,3-disubstituted phthalides wherein the 3,3 substituents may be the same or different is disclosed and claimed in U.S. Pat. No. 3,931,228 to Alan L. Borror. In the latter method, a phenol or a 1-naphthol is reacted with phthalaldehydic acid to give the corresponding p-phthalidylphenol or p-phthalidylnaphthol adduct which is oxidized by dehydrogenation to selectively remove the hydrogen from the 3-position of the phthalidyl portion of the adduct and to remove the hydrogen from the phenolic or naphtholic hydroxy group. This oxidized intermediate is then condensed with a phenol, 1-naphthol, etc., preferably in the presence of an acid catalyst to yield the 3,3-disubstituted phthalide.

Rather than reducing the 3,3-disubstituted phthalide to the corresponding 3,3-disubstituted phthalan, the phthalan may be synthesized directly by reacting one equivalent of phthalide with, for example, two equivalents of a protected lithiated phenol, such as, 2'-tetrahydropyranyl 4-Li-phenyl ether, to give the corresponding symmetrical 3,3-disubstituted phthalan followed by removal of the 2'-tetrahydropyranyl protecting groups to regenerate the phenolic hydroxy groups as shown below:

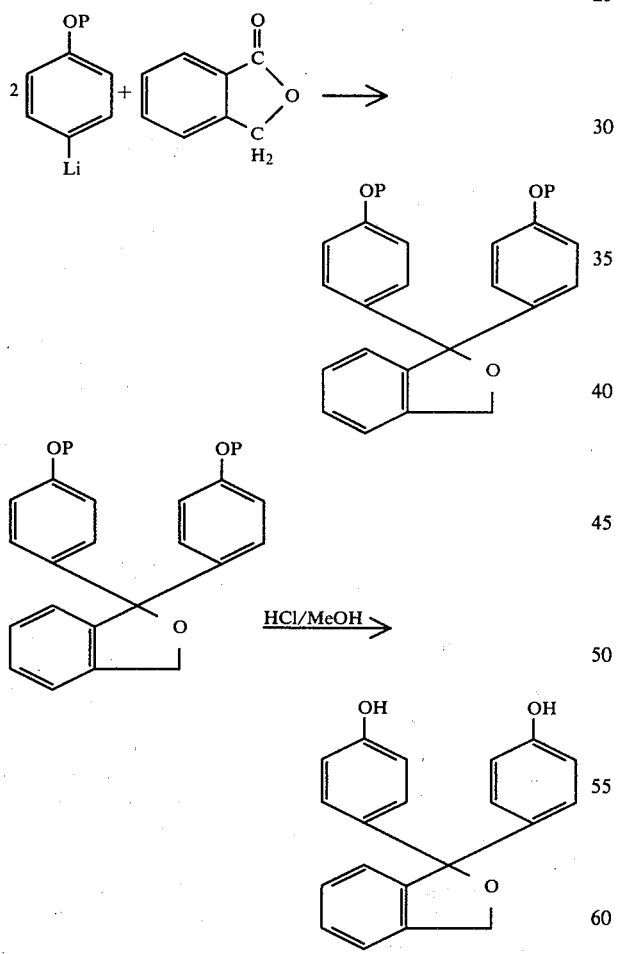

P=protecting group

Unsymmetrical phthalans may be prepared by reacting one equivalent of an organolithium reagent, such as, a 4-Li-N,N-(dialkyl)aniline with one equivalent of phthalide to give the 4-(2'-hydroxymethylbenzoyl)-N,N-(dialkyl)aniline and then reacting this intermediate with, for example, 4-(2'-tetrahydropyranyloxy)phenyllithium to give the corresponding unsymmetrical 3,3-disubstituted phthalan followed by deblocking of the phenolic—OH, i.e., removing the 2'-tetrahydropyranyl protecting group.

It will be appreciated that any appropriate blocking group as commonly used for protecting the functional phenolic or naphtholic —OH and other —OH substituents that may be present may be employed. As an illustration, blocked phenols and 1-naphthols may be prepared by methoxymethylation as described, for example, by Kaoru Fuji et al, Synthesis, 4, pp. 276–277 (1975), tetrahydropyranylation as described, for example, by William E. Parham et al, *J. Amer. Chem. Soc.*, 70, pp. 4187–4189 (1948) or by silylating with dimethyl-t-butylsilyl chloride in the presence of imidazole as described by E. J. Corey et al, *J. Amer. Chem. Soc.*, 94, pp. 6190–6191 (1972).

A method that may be employed in synthesizing the phthalol acetyl derivatives is that disclosed by M. Hubacher, *J. Amer. Chem. Soc.*, 74, p. 5216 (1952). This method comprises reducing the selected phthalin with lithium aluminum hydride in absolute ether to the corresponding phthalol and then reacting the phthalol with the selected acid.

The following examples are given to further illustrate the present invention and are not intended to limit the scope thereof.

EXAMPLE 1

Preparation of the compound having the formula

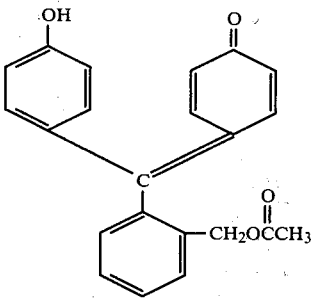

(a) Lithium aluminum hydride (3.0 g) and 100 ml of dry tetrahydrofuran were placed in a 3-neck flask equipped with a mechanical stirrer, condenser with a nitrogen inlet and addition funnel. Phenolphthalein (6.4 g) dissolved in 300 ml of dry tetrahydrofuran was added dropwise to the stirred lithium aluminum hydride suspension at a rate to maintain a gentle reflux. When addition was complete, the reaction mixture was stirred for six hours at reflux by heating with an oil bath and then allowed to stand overnight. To the stirred solution was added excess ethyl acetate followed by 500 ml of water. The pH was adjusted to approximately 2 with conc. HCl and the solution extracted with two 500 ml portions of ether. The ether layer was washed six times with 10% aqueous potassium carbonate (each time the base layer was magenta), and then evaporated to dryness to leave an off-white solid (4.5 g crude yield). The solid was crystallized from 440 ml of 20% ethanol and dried in vacuo at 60° C. to give the corresponding phthalan as very light yellow crystals (yield 3.3 g; melting range 195°–197.5° C.). TLC using ether-silica gel gave one spot. Nmr did not show methine H and was more consistent with the cyclic ether (phenolphthalan) than the open form (phenolphthalol).

(b) Into a test tube was placed the tip of a spatula of the phthalan prepared in step (a) and about 0.5 ml of glacial acetic acid. Two drops of conc. sulfuric acid were added (a bright orange color was observed), and the reaction mixture was heated for 10 minutes at about 80° C., poured into 10 ml of water and extracted with ether. TLC of the ether layer on silica gel showed the tital compound as a yellow spot, which was identical to a sample of the title compound prepared as follows:

(1) In a test tube was placed 0.2 g of phenolphthalol and 2 ml of glacial acetic acid. The reaction solution was heated at reflux for 1½ hours, poured into 50 ml of water and extracted two times with ethyl ether. The ether was washed with sodium bicarbonate solution, brine, dried over sodium sulfate and dried in vacuo leaving a colorless oil having a brownish tinge. TLC with ether/silica gel showed a small amount of starting material and a major spot above the starting material, which was the monoacetyl ester of phenolphthalol.

(2) The monoacetyl ester of phenolphthalol prepared in step (1) without purification was dissolved in 10 ml of dry tetrahydrofuran in a test tube. Dicyanodichloroquinone (0.2 g) was added all at once. The reaction mixture became yellow-brown and was allowed to stand one hour with stirring. TLC using silica gel/ether showed one major spot. Preparative TLC on a portion of the tetrahydrofuran solution gave a small amount of the title compound as a yellow oil. (TLC showed the oil to be homogeneous.)

The phenolphthalol was prepared as follows:

(i) Sodium dithionite (26.1 g) was added to a solution of 20 g of sodium hydroxide dissolved in 400 ml water, and then phenolphthalein (15.92 g) was added giving a red-pink solution. An exotherm to about 35° C. was observed. The reaction mixture was then heated to 83° C. over about 20 minutes. The hazy straw solution was then placed in an ice bath, and 42 ml of conc. HCl was slowly added as the solution cooled from 35° to about 5° C. After about 24 mls HCl had been added, a precipitate began to form. After all of the HCl had been added, the strongly acidic solution was filtered and the white solid collected and washed with water. The damp filter cake was set aside overnight and then heated under reflux in about 1500 ml water. When the refluxing solution started to foam in the condenser at 100° C., the solution was filtered hot. (Considerable solid had failed to dissolve.) A solid appeared almost immediately in the filtrate. A small amount of the solid in the filtrate turned faint pink in aqueous sodium hydroxide, but the "insolubles" collected from the hot water solution did not turn pink with sodium hydroxide. The white hot water "insoluble" solids were then dissolved in about 500 ml methanol to give a slightly hazy straw solution which was heated and filtered giving a clear, colorless filtrate. The filtrate was evaporated leaving a white, solid residue which was redissolved in about 200 ml of methanol and again evaporated to give 12.5 g of white solid residue. The filtrate containing the hot water "soluble" solids was filtered and the tiny white needles that were collected were pressed and remained quite damp. Both the white solid residue and the white needle solids were heated under vacuum for several hours and then maintained under vacuum at room temperature. Drying under vacuum was repeated giving phenolphthalin in a total yield of 15.03 g (12.11 g of hot water "insolubles" plus 2.92 g of hot water "solubles," both of which melted at 237°–239° C. giving clear, light yellow melts).

(ii) In a three-neck flask equipped with a magnetic stirrer, nitrogen inlet and condenser vented to an exhaust bubbler, 2,92 g of phenolphthalin was dissolved in 100 ml methanol. To this solution was added 2 drops conc. sulfuric acid, and then the reaction solution was heated under nitrogen in an oil bath. Additional conc. sulfuric acid (approximately 25 drops) was added and refluxing under nitrogen was continued until the reaction was essentially complete. The reaction solution was then poured into 200 ml ice water, treated with sodium bicarbonate to neutralize the sulfuric acid and evaporated to remove the methanol. The white solid residue was collected, washed with water and pressed dry to give 2.93 g of the methyl ester of phenolphthalin.

(iii) A solution of 0.5 g of the methyl ester of phenolphthalin prepared in step (ii) dissolved in 30 ml dry tetrahydrofuran was slowly added to a suspension of 0.5 g of lithium aluminum hydride in 20 ml dry tetrahydrofuran. The resulting reaction mixture was heated at reflux for 30 minutes, and then excess ethylacetate was added. The reaction mixture was poured into 1 N HCl, extracted with two 200 ml portions of ethyl ether and the ether evaporated leaving a residue of solid and some water. The residue was taken up in ethyl ether and the ether decanted from water, dried over sodium sulfate, filtered and the solvent removed in vacuo to give 0.42 g of phenolphthalol as a white solid. TLC on silica gel using ether showed the title compound as one major spot, and nmr was consistent with the phthalol structure.

EXAMPLES 2–4

Preparation of the compounds having the formulae

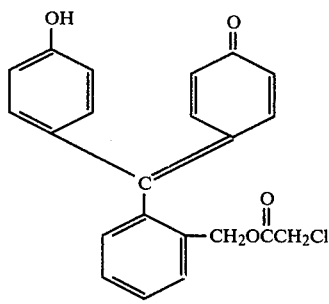

Example 2

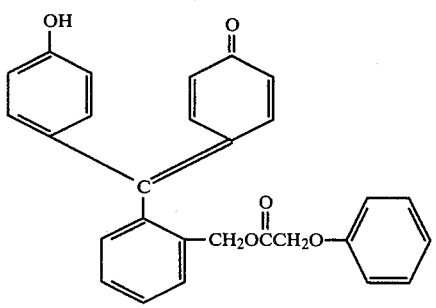

Example 3

-continued

Example 4

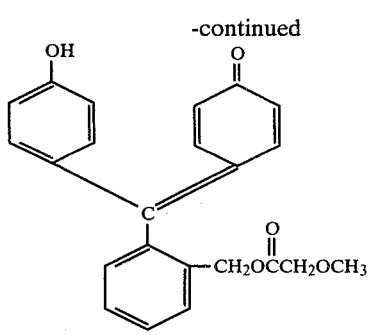

(a) Phenolphthalan was prepared according to the procedure given in step (a) of Example 1 above.

(b) About 100 mg of phenolphthalan was dissolved in 0.5 ml of chloroacetic acid, phenoxyacetic acid and methoxyacetic acid, respectively. Two drops of conc. sulfuric acid was added to each reaction solution, and each solution was heated for 10 minutes at about 80° C. After adding 10 ml of water, each solution was extracted with ether. Preparative TLC of the yellow ether layer using silica gel/ether gave the respective title compounds.

The compound of Example 4 also was prepared as follows:

(1) To a one liter 3-neck flask under nitrogen was added 250 ml of dry tetrahydrofuran followed by 4.61 g of lithium aluminum hydride (95%). Phenolphthalein (20.0 g) dissolved in 250 ml of dry tetrahydrofuran was added dropwise to the well-stirred lithium aluminum hydride suspension at a rate to prevent a violent reaction. Addition was completed in 90 minutes. The reaction mixture was then refluxed for 30 minutes by applying external heat. Silica gel TLC in ether showed some unreacted phenolphthalein was present. Refluxing was continued for 2½ hours. Silica gel TLC in ether showed no further changes. The heat source was removed, and 60 ml of ethyl acetate was added to the reaction mixture to destroy unreacted lithium aluminum hydride. Then 200 ml of saturated ammonium chloride was added and the pH adjusted to about 4 to 6 with 1 N HCl. The organic portion was decanted and the solvent removed under reduced pressure leaving a yellow oil. The oil was dissolved in 350 ml of ether and the ether extracted with a total of 4 liters of 10% sodium carbonate to remove unreacted phenolphthalein. Then the ether was removed leaving a yellow oil which was dissolved in one liter of boiling 20% ethanol:80% water mixture to give a clear, pink-red solution. Upon cooling, an off-white crystalline product formed, and the solution was allowed to stand in the refrigerator for three days. The solids were filtered, washed with room temperature 20% ethanol to remove a yellow-pink color and collected giving a very pale yellow, crystalline product. Recrystallization from 750 ml of 20% ethanol gave 11.8 g of the corresponding phthalan as a very pale yellow crystalline solid. Silica gel TLC in ether showed only one spot corresponding to the phthalan.

(b) To 5.0 g of phenolphthalan was added 30 ml of methoxyacetic acid and the mixture stirred vigorously. Not all solids dissolved. The mixture was cooled in an ice water bath and 2.32 g of borontrifluoride etherate was added. A pink-yellow color developed. The reaction mixture was stirred cold for 30 minutes and allowed to come to room temperature. Not all solids had dissolved, and the reaction mixture was heated gently for 35 minutes. Silica gel TLC in ether showed unreacted phthalan. Another 2.32 g portion of borontrifluoride etherate was added and gentle heating was continued for one hour. Unreacted phthalan was again detected by TLC. An additional 5.0 g of borontrifluoride etherate was added, and after gentle heating and continued stirring for one hour, silica gel TLC in ether showed almost no phthalan. The reaction mixture was diluted with ice water and extracted with ether. The yellow ether solution was washed with several portions of fresh water and dried over anhydrous sodium sulfate. The ether was removed leaving a deep yellow oil containing some water which was dried under vacuum in the presence of sulfuric acid. The oil (4.4 g) was purified by high pressure liquid chromatography using approximately 25% methanol in dichloromethane to yield 2.6 g of the title compound.

EXAMPLE 5

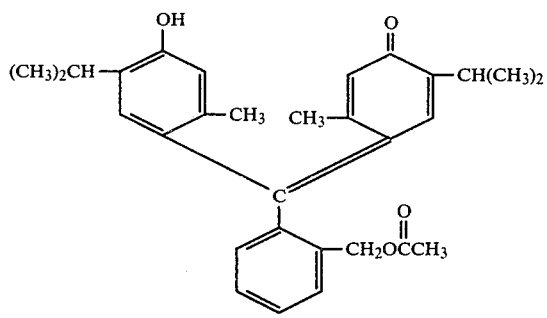

(a) The phthalan of thymolphthalein was prepared according to the procedure given in step (a) of Example 1 above and the crude product used without purification.

(b) The crude product obtained in step (a) above (4.8 g) was dissolved in 30 ml of acetic acid, and 6.5 g of borontrifluoride etherate was added. The reaction mixture was heated near reflux for 2½ hours. Silica gel TLC showed a new yellow spot had formed above the starting material. The reaction mixture was poured into water and extracted with dichloromethane. The organic solvent portion was washed with several portions of water and the solvent removed leaving a yellow solid. Preparative TLC on silica gel with 90%:10% ether/petroleum ether gave 0.116 g of the title compound as an orange-yellow solid.

EXAMPLE 6

Preparation of the compound having the formula

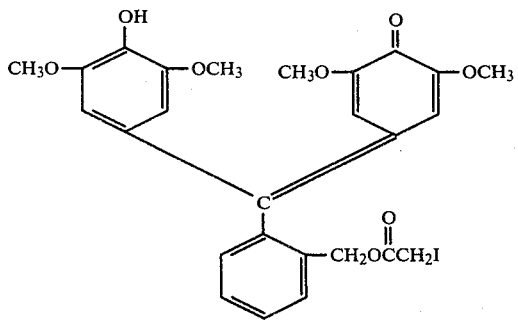

(a) In a flame-dried 3-neck flask equipped with a nitrogen inlet, magnetic stirrer, thermometer rubber septum and dry ice-acetone bath, 12.68 g of 2'-tetrahydropyranyl 4-bromo-2,6-dimethoxyphenyl ether was dissolved in 200 ml of dry tetrahydrofuran under nitrogen while cooling to −60° C. To the solution was added 25 ml of n-butyllithium (1.6 M in hexane) via syringe over about 10 minutes at a rate to maintain the temperature between −50° and −60° C. After stirring for about 30 minutes at −50° to −60° C., 2.68 g of phthalide was added all at once giving a light yellow solution. The reaction solution was allowed to stir while the reaction temperature came to room temperature over the weekend. A small sample of the reaction mixture (½ ml) was poured on ice, diluted with HCl and extracted with ether. TLC of the ether using silica gel/petroleum ether-ether (2:1) showed a major spot that turned deep magenta when treated with sulfuric acid. The remaining mixture was poured over 100 cc of crushed ice, the pH adjusted to 5-6 with dilute HCl with stirring, and extracted with two 125 ml portions of ether. The ether extracts were combined, washed with water (three 50 ml portions), dried over sodium sulfate and filtered. The solvent was removed under reduced pressure and the residue dried in vacuo for 2 hours at room temperature. About 10.3 g of the residue was dissolved in 50-75 ml of methanol at room temperature and then 3 drops of conc. HCl were added. After stirring overnight at room temperature, the off-white crystals were filtered, washed with methanol and air dried to give 4.64 g of 3', 3", 5', 5"-tetramethoxyphenolphthalan.

(b) Twenty drops of conc. sulfuric acid were added to a stirring melt of 1.06 g of the phthalan prepared in step (a) and 10 g of iodoacetic acid at 75° C., and stirring and heating were continued for 45 minutes. The dark mass was then poured over about 25 cc of crushed ice and extracted with four 25 ml portions of methylenechloride. The combined methylenechloride extracts were washed with water, filtered and the solvent removed at 35°-40° C. under reduced pressure. 100 ml of ether was added to the dark residue, and after stirring for about one hour, the dark crystals were removed by filtration. The solid was dissolved in ethanol containing Norite; the solution filtered and placed in a refrigerator for 2-5 hours to induce crystallization. The crystals were filtered, washed with two 10 ml portions of ethanol and then ether and air dried to give 645 mg of the title compound.

EXAMPLE 7

Preparation of the compound having the formula

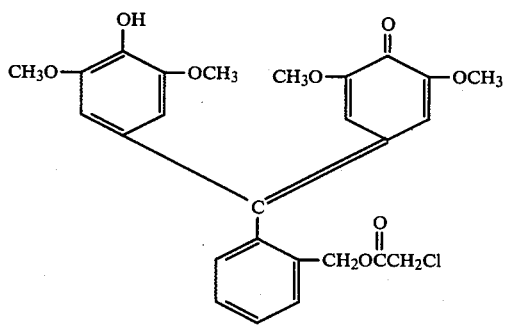

The title compound was prepared according to the procedure given in Example 6 except that chloroacetic acid was substituted for iodoacetic acid in step (b).

EXAMPLE 8

Preparation of the compound having the formula

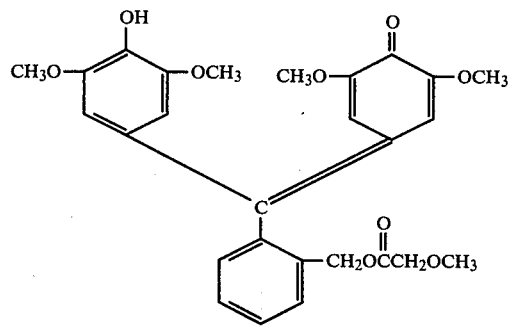

(a) The procedure of step (a) of Example 6 was repeated using 25.36 g of 2'-tetrahydropyranyl 4-bromo-2,6-dimethoxyphenyl ether dissolved in 400 ml of dry tetrahydrofuran, 50 ml of n-butyllithium (1.6 M in hexane) and 4.83 g of phthalide but adding a solution of 7 g of ammonium chloride to the iced reaction mixture instead of dilute HCl. The yield of 3',3",5',5"-tetramethoxyphenolphthalan after recrystallizing the air-dried solids from 100 ml of boiling ethanol was 9.02 g.

(b) The phthalan prepared in step (a) (8.5 g) was dissolved in 90 g of methoxyacetic acid at 90°-95° C. 15 ml of boronfluoride etherate was added dropwise while stirring giving a deep green solution. Heating and stirring of the reaction mixture at 95° C. was continued for 1¼ hours and then a small sample prepared for TLC using silica gel and 3% methanol/methylene chloride. After 15 minutes, the remaining reaction mixture was poured over 100 cc of crushed ice and extracted with two 125 ml portions of ether. The combined ether extracts were washed with two 50 ml portions of water and the combined aqueous phases were extracted with three 100 ml portions of methylene chloride. The combined methylene chloride extracts were washed with 50 ml water, dried over sodium sulfate, filtered and the solvent removed leaving 18.7 g of residue. The foregoing procedure was repeated and residues from the methylene chloride extracts were combined giving a total residue of 31.45 g. High pressure chromatography using methylene chloride/methanol (trace) gave 14.5 g of product which was dried in vacuo at room temperature overnight, then dissolved in methanol and the methanol solution filtered through Celite. The solvent was removed and the solid vacuum dried to give 12.5 g of the title compound.

EXAMPLE 9

Preparation of the compound having the formula

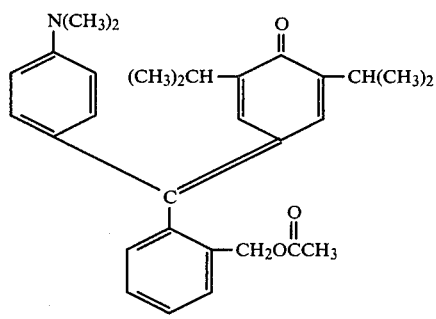

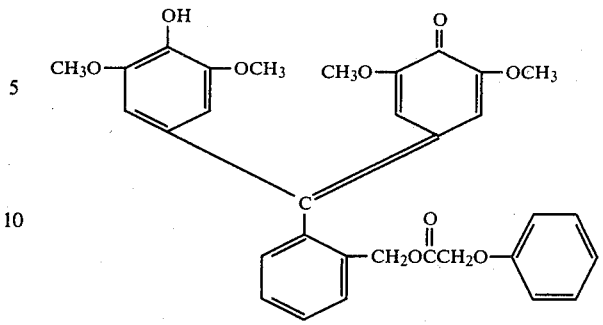

(a) Lithium aluminum hydride (0.2 g) was added to approximately 40 ml of dry tetrahydrofuran at room temperature under nitrogen. 3-[4'-(dimethyl)amino-1'-phenyl)-3-(3",5"-diisopropyl-4"-oxo-1"-phenyl)phthalide (1.0 g) was dissolved in 40 ml dry tetrahydrofuran and the solution added dropwise to the lithium aluminum hydride suspension. The temperature rose to about 30° C. Upon completion of addition, a sample of the reaction mixture was poured into water and extracted with ether. TLC on silica gel with 1:1 ether/petroleum ether showed completion of the reaction and no unreacted phthalide. After neutralizing the lithium aluminum hydride with ethylacetate, the reaction mixture was poured into 200 ml water, the pH adjusted to 3 with HCl and extracted with ether. The ether layer was washed with 200 ml of 5% aqueous sodium hydroxide, dried over sodium sulfate and the ether evaporated to leave a pink-red residue. The residue was dissolved in about 20 ml ether, and petroleum ether was added to precipitate a white solid. The solution after filtering was evaporated to give the corresponding phthalan as a pink solid.

(b) The phthalan prepared in step (a) was dissolved in approximately 20 ml of glacial acetic acid, and approximately 2 ml of borontrifluoride etherate solution was added. The resulting orange-red solution was heated on a steam bath for one and three-fourths hours. TLC of the reaction solution on silica gel with 1:1 ether/petroleum ether showed no unreacted phthalan. The reaction solution was then poured into 100 ml water, extracted with ether, the ether dried and evaporated to leave a tarry residue with an odor of acetic acid. The residue was dissolved in about 20 ml methanol and then poured into 100 ml water to yield a red powder on filtering. The powder was dried and then passed through a column wet packed with silica gel (100-200 mesh) and 1:1 ether/hexane and eluted with the same solvent. The appropriate fractions were collected and evaporated to give 0.040 g of the title compound as a brick-red solid. (TLC showed one spot.)

EXAMPLE 10

Preparation of the compound having the formula

To a stirred mixture of 3',3",5',5"-tetramethoxyphenolphthalan (3.9 g; 0.009 M) and phenoxy acetic acid (20.0 g; 0.13 M) was added a small amount of borontrifluoride etherate. This was gently heated until a melt occurred. Additional $BF_3 \cdot Et_2O$ (6.0 ml) was added dropwise to the melt over a 10 minute period. After stirring the resulting deep blue solution for about 10 minutes at 95° C., it was diluted with 350 ml of ice water and extracted with ether. The ether was removed and the residue was dissolved in benzene. This solution was repeatedly extracted with hot water to remove excess phenoxy acetic acid. The benzene layer was dried over sodium sulfate and the solvent removed to give 5.7 g of crude product. A pure sample of the title compound was obtained using high pressure preparative liquid chromatography (silica gel/3% methanol/methylene chloride).

EXAMPLE 11

Preparation of the compound having the formula

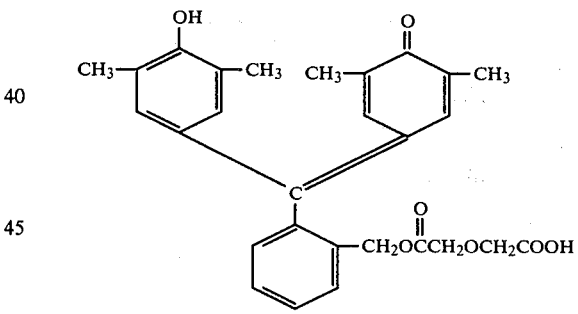

(a) Into a 2 liter flask, equipped with a nitrogen inlet, a mechanical stirrer and a thermometer, was placed 9.52 g (0.0264 M) of 3',3",5',5"-tetramethylphenolphthalan, 41.2 g (0.63 M) of zinc dust and 300 ml acetic acid. A mild exotherm was noticed (31° C.). The grey slurry was stirred at room temperature for 6 hours, filtered and the filtrate was slowly added to 2 liters of water. The resulting white precipitate was collected by filtration, dissolved in hot methylene chloride, filtered through sodium sulfate and allowed to crystallize overnight. After isolation and drying, 6.6 g of the corresponding 3',3",5',5"-tetramethylphenolphthalol was obtained as off-white crystals. An additional quantity of the said phthalol was prepared by the above procedure.

(b) Into a one liter flask equipped with a magnetic stirring bar, a nitrogen inlet and a distillation head, was added 500 ml of dry toluene, 21.59 g (0.185 M) of diglycolic anhydride, and a small amount of p-toluenesulfonic acid monohydrate ("tip of spatula"). This mixture was heated to its boiling point. After about 50 ml of toluene-water azeotrope had been removed, 8.29 g (0.018 M) of 3',3'',5',5''-tetramethylphenolphthalol was added to the hot solution; heating was resumed and about 70 ml of distillate was removed. After heating the solution under reflux conditions for 4 hours, the toluene was removed. The residue was taken up in methylene chloride and extracted three times with a total of 750 ml of water. The organic layer was dried over sodium sulfate, filtered, and the solvent removed to give 9 g of material comprising the corresponding phthalol acyl derivative of the formula

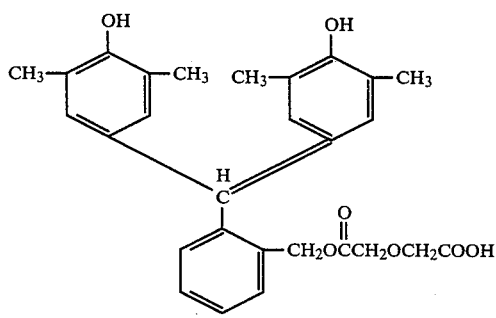

This material was obtained as a light yellow froth and was used without further purification.

(c) To a stirred slurry of the phthalol acyl derivative obtained in step b (7.4 g; 0.0155 M), sodium bicarbonate (6.51 g; 0.078 M) and water (200 ml) was added dropwise, a solution of 4.44 g (0.018 M) iodine in 175 ml methylene chloride. After a total of 20 minutes of stirring at room temperature, the aqueous layer was separated and neutralized by adding it to one liter of water containing 15 ml concentrated hydrochloric acid. The aqueous fraction was extracted with methylene chloride, the organic layer was dried over sodium sulfate and the solvent was removed in vacuo. The dark orange residue was purified via medium pressure column chromatography (silica gel) methanol-methylene chloride; methanol content varied from 0.5-2%). The title compound was isolated as an orange glass. ($\lambda$max 242 nm, Epsilon 22,500 as measured in ethanol)

The 3',3'',5',5''-tetramethylphenolphthalan used in the foregoing example was prepared according to the procedure given in step a of Example 6 using 2'-tetrahydropyranyl-4-bromo-2,6-dimethylphenyl ether.

EXAMPLE 12

Preparation of the compound having the formula

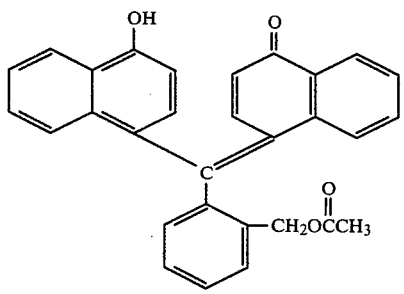

(a) Lithium aluminum hydride (0.2 g) was added to 65 ml of anhydrous tetrahydrofuran at room temperature under nitrogen. To this stirred mixture was added a 30 ml solution of 1.0 g of 3,3-bis-[4'-(2''-tetrahydropyranyloxy)-1'-naphthyl)]-phthalide in tetrahydrofuran dropwise. Upon completion of addition, TLC on silica gel with ether showed the reaction was complete. Ethylacetate was added dropwise until the exotherm and hydrogen evolution ceased. The reaction mixture was poured into water, made pH 6 with HCl and extracted with ether. The ether was evaporated to yield a yellow solid. A sample of the yellow solid was dissolved in methanol and a drop of conc. HCl was added. A yellow-green color developed.

The resulting solution was refluxed for 10 minutes, and TLC on silica gel with 1:1 ether/petroleum ether showed that deblocking of the 2''-tetrahydropyranyl protecting groups from the naphtholic —OH groups was complete. The methanol was then removed under vacuum to give the 1-naphthol phthalan.

(b) Glacial acetic acid was added to the 1-naphthol phthalan prepared in step (a) along with several drops of borontrifluoride etherate solution. An intense green color formed. The reaction solution was heated on a steam bath until a yellow-green color began to develop (about 15 minutes), then poured into water and extracted with ether. The ether was evaporated, and TLC on the residue using silica gel with 1:1 ether/petroleum ether showed many spots. The spot that was orange-brown on drying and turned blue with sodium hydroxide solution was the title compound which was isolated and purified using preparative TLC techniques.

As noted previously, the compounds of the present invention are useful in photographic products and processes, e.g., as light-screening dyes, for example, antihalation or color correction filter dyes and may be employed in a conventional manner in the appropriate layer or layers of a photosensitive film unit. The use of the subject compounds in photographic products and processes is disclosed and claimed in copending U.S. patent application Ser. No. 106,520, now abandoned, of James W. Foley filed concurrently herewith. For convenience, the specification of this application is specifically incorporated herein.

As discussed above and also in the aforementioned application, the subject compounds have the ability to decolorize completely and irreversibly in base by undergoing an irreversible cleavage reaction after a predetermined time at a predetermined pH to give a new colorless compound which remains colorless at the pH's normally encountered during processing subsequent to "bleaching" so that the new compound may be retained in a photographic film unit, e.g., a photosensitive element without the possibility of color reappearing in time. In this regard, a sample of the compound prepared in Example 8 above was dissolved in a small amount of methanol, and aqueous 1 N sodium hydroxide was added to decolorize the compound. After decolorization, aqueous hydrochloric acid was added to the solution to lower the pH to pH 1, and it was observed that the solution remained colorless even at pH 1.

Also, the "bleaching" rates for the compounds of Examples 1 to 4 were determined in terms of T ½. By T ½ is meant the time measured for one-half of the colored compound to decolorize. In making these determinations the pure yellow dyes of Examples 1 to 4 were dissolved in a small amount of methanol and the resulting solutions sprayed into aqueous 1 N NaOH (pH=14), or into pH 11 or pH 12 buffer. The half-life (T ½) as measured in seconds for each compound is set out in the following Table.

23

TABLE

| Example No. | Half-life (T ½ - seconds) | | |
|---|---|---|---|
| | pH = 14 | pH = 12 | pH = 11 |
| 1 | ≃5.0 | — | — |
| 2 | 0.03(calc)* | — | 33.0 |
| 3 | ** | — | — |
| 4 | 0.4 (calc)* | 40.0 | — |

*calculated
**very fast - not measured

The bleaching of all compounds was complete and no color returned after reducing the pH of the respective solutions to pH=1 to 2 by pH paper and then raising it to pH 13.

In addition to their utility as photographic light-screening dyes, the subject compounds may be used as a means for detecting the presence of alkali and also may be used in a validation or verification system, e.g., for documents by using their ability to decolorize within a predetermined time at a predetermined alkaline pH. For the latter and other related uses, the subject dyes may be employed to provide a particular pattern or symbol by treating a layer of the dye with an aqueous alkaline solution applied in an imagewise fashion to give the desired pattern or configuration.

Since certain changes may be made in the above product without departing from the scope of the invention herein involved, it is intended that all matter contained in the above description shall be interpreted as illustrative and not in a limiting sense.

What is claimed is:

1. A compound of the formula

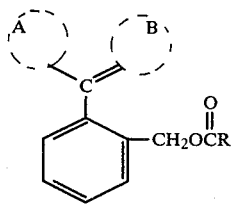

wherein A is a phenyl moiety or a naphthyl moiety; B is a 4'-oxo-1'-phenylidene moiety or a 4'-oxo-1'-naphthylidene moiety and R is selected from hydrogen; alkyl, unsubstituted or substituted with halo, alkoxy, carboxy-substituted alkoxy, phenoxy or phenyl; or phenyl, unsubstituted or substituted in the m- or p-position with halo, alkoxy, nitro, dimethylamino or alkyl.

2. A compound as defined in claim 1 wherein said R is hydrogen.

3. A compound as defined in claim 1 wherein said R is alkyl, unsubstituted or substituted with halo, alkoxy, carboxy-substituted alkoxy, phenoxy or phenyl.

4. A compound as defined in claim 1 wherein said R is phenyl, unsubstituted or substituted in the m- or p-position with halo, alkoxy, nitro, dimethylamino or alkyl.

5. A compound of the formula

24

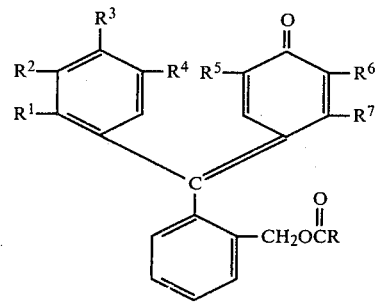

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, —N,N-(dialkyl)amino, —N,N—(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^5$ is hydrogen, phenyl, alkyl, alkoxy, chloro or fluoro; $R^6$ is hydrogen, alkyl, alkoxy, chloro or fluoro; $R^7$ is hydrogen, alkyl, alkoxy or hydroxy and $R^6$ and $R^7$ taken together represent the carbon atoms necessary to complete a fused benzene ring; and R is hydrogen; alkyl, unsubstituted or substituted with halo, alkoxy, carboxy-substituted alkoxy, phenoxy or phenyl; or phenyl, unsubstituted or substituted in the m- or p-position with halo, alkoxy, nitro, dimethylamino or alkyl.

6. A compound as defined in claim 5 wherein said R is hydrogen.

7. A compound as defined in claim 5 wherein said R is alkyl, unsubstituted or substituted with halo, alkoxy, carboxy-substituted alkoxy, phenoxy or phenyl.

8. A compound as defined in claim 5 wherein said R is phenyl, unsubstituted or substituted in the m- or p-position with halo, alkoxy, nitro, dimethylamino or alkyl.

9. A compound as defined in claim 5 wherein said $R^3$ is hydroxy.

10. A compound as defined in claim 5 wherein said $R^3$ is —N,N-(dialkyl)amino.

11. A compound as defined in claim 5 wherein said $R^1$ and $R^2$ taken together represent the carbon atoms necessary to complete a fused benzene ring and said $R^6$ and $R^7$ taken together represent the carbon atoms necessary to complete a fused benzene ring.

12. A compound as defined in claim 11 wherein said $R^3$ is hydroxy.

13. The compound

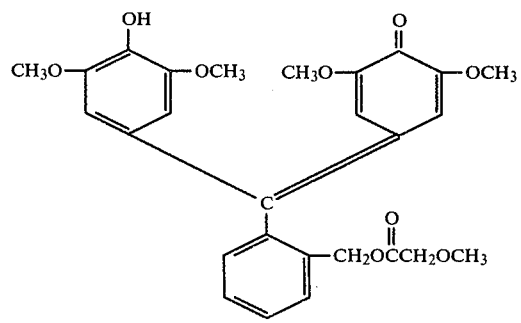

14. The compound
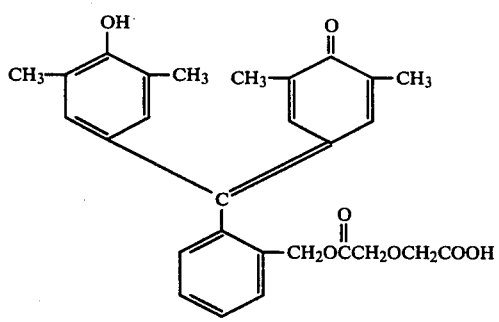
15. The compound
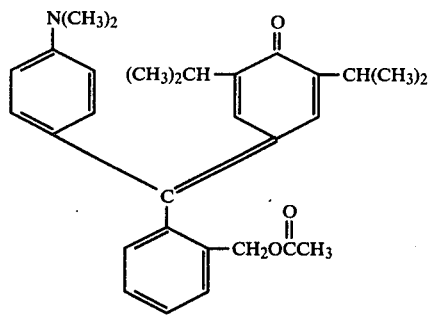
* * * * *